April 19, 1938. H. C. JOHANSEN 2,114,305
CHUCK MECHANISM
Filed July 9, 1936 2 Sheets-Sheet 1

Inventor:
Harry C. Johansen.
by
Louis A. Maxom.
Att'y.

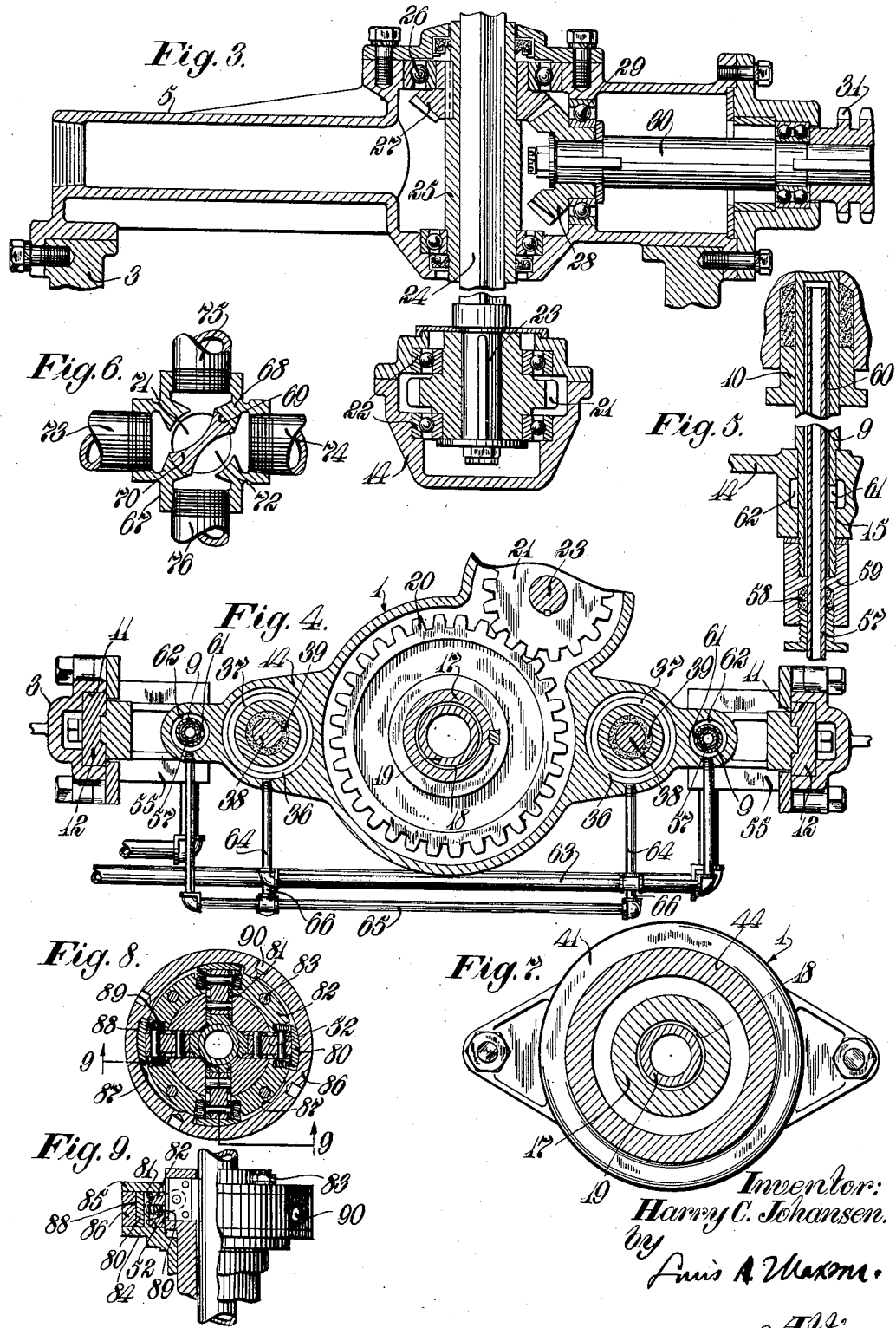

Patented Apr. 19, 1938

2,114,305

UNITED STATES PATENT OFFICE 2,114,305

CHUCK MECHANISM

Harry C. Johansen, Michigan City, Ind., assignor to Sullivan Machinery Corporation, a corporation of Massachusetts Application July 9, 1936, Serial No. 89,809

15 Claims. (Cl. 255—22)

This invention relates to chuck mechanisms, and more particularly, but not exclusively, to improvements in a chuck mechanism especially designed to use with the hydraulic feeding mechanism of a rotary drilling apparatus.

An object of this invention is to provide an improved chuck mechanism having improved operating means therefor. Another object is to provide an improved chuck mechanism especially designed to use with a hydraulic feeding mechanism for connecting the element to be fed with the power feeding element. A further object is to provide an improved chuck mechanism of the hydraulically operated type. Yet another object is to provide an improved hydraulically operated chuck mechanism for connecting a drill to be fed to the hydraulic feeding mechanism of a rotary drilling apparatus. A still further object is to provide an improved drill rod chuck mechanism for connecting the drill rod to the hydraulic feeding mechanism of a rotary core drilling apparatus. These and other objects will, however, hereinafter more fully appear.

In the accompanying drawings there are shown for purposes of illustration one form and a modification which the invention may assume in practice.

In these drawings:

Fig. 3 is a vertical section, showing a portion of the drill rod rotating means.

Fig. 4 is a horizontal sectional view taken substantially on line 4—4 of Fig. 1.

Fig. 5 is an enlarged detail sectional view showing a portion of one of the telescopic fluid supply connections.

Fig. 6 is a detail sectional view taken through the four-way control valve.

Fig. 7 is a horizontal sectional view taken substantially on line 7—7 of Fig. 1.

Fig. 8 is a horizontal sectional view showing a modified form of chuck jaw adjusting means.

Fig. 9 is a vertical sectional view taken substantially on line 9—9 of Fig. 8.

Figure 1:
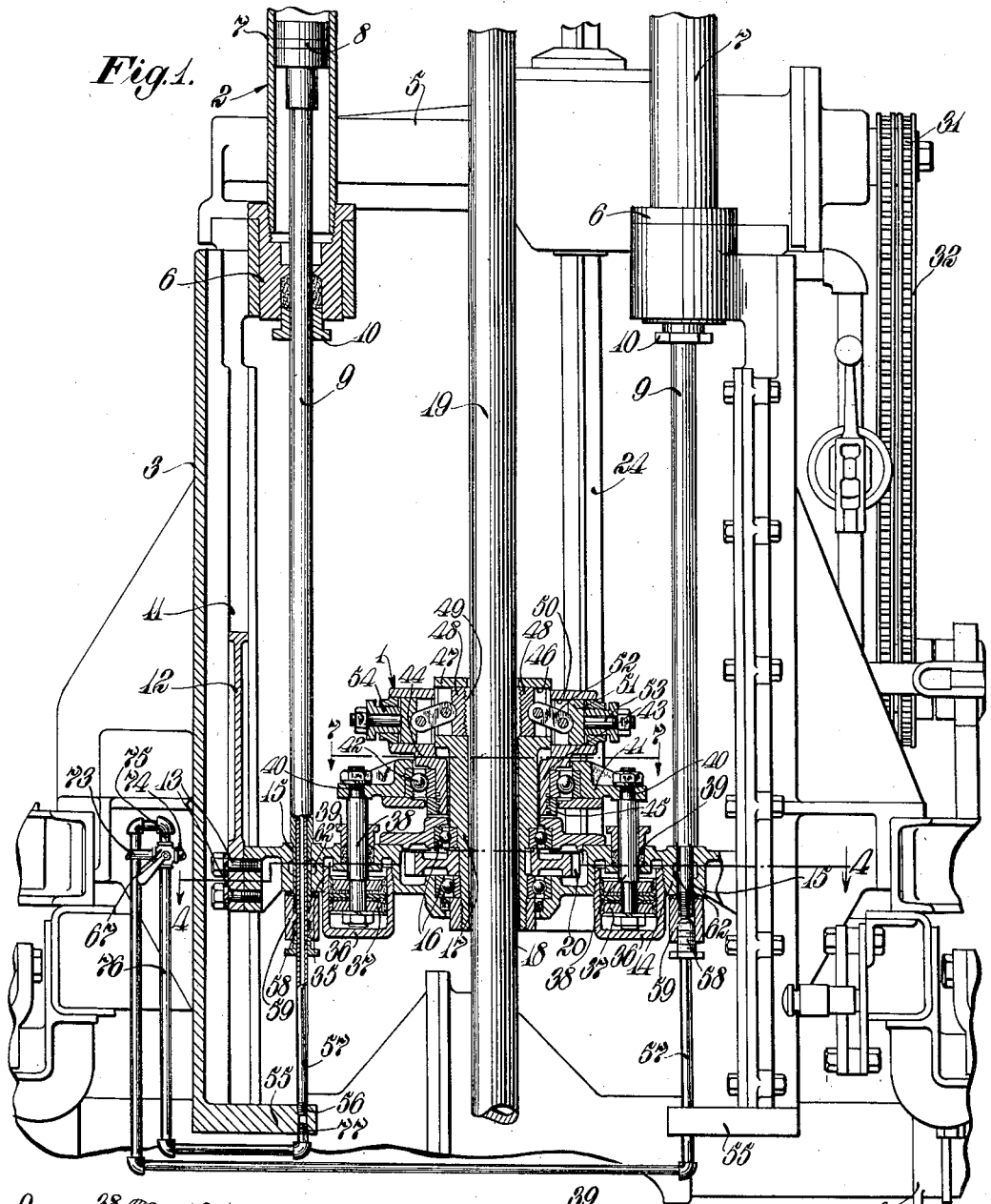
Fig. 1 is an elevational view, with parts in vertical section, showing a hydraulic drill rod feeding mechanism having embodied therein the illustrative form of the improved chuck mechanism.
Figure 2:
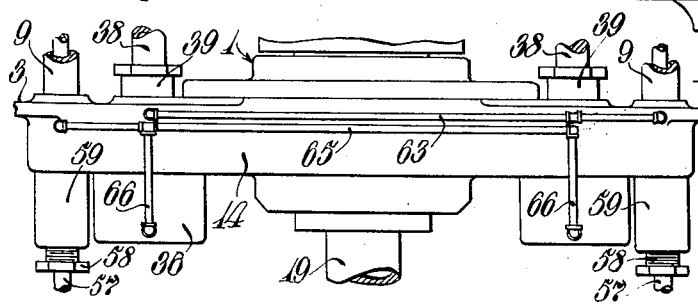
Fig. 2 is a fragmentary elevational view of the lower portion of the feeding mechanism and the associated chuck mechanism.

In this illustrative embodiment of the invention, the improved chuck mechanism, generally designated 1, is shown embodied in the hydraulic feeding mechanism, generally designated 2, of a rotary core drilling apparatus. The hydraulic feeding mechanism may be of the same general character as that disclosed in my co-pending application Serial No. 89,300, filed July 7, 1936, although it will be evident that the improved chuck mechanism may be associated with mechanisms of various other types. As disclosed in the above mentioned co-pending application, the hydraulic feeding mechanism comprises a vertical frame structure 3 mounted on a suitable base 4 and supporting a transverse upper frame 5. Secured within heads 6 mounted within the upper portion of the frame structure are vertical hydraulic feed cylinders 7, arranged in parallel relation at the opposite sides of the frame structure and containing reciprocable feed pistons 8 having piston rods 9 extending downwardly through stuffing boxes 10 mounted within the cylinder heads 6. Formed along the opposite sides of the frame structure 3 are vertical guideways 11 having mounted therein for vertical reciprocatory movement sliding guide shoes 12. The lower portions of these sliding guide shoes are secured as by screws 13 to a transverse frame 14, the frame 14, together with the sliding guide shoes 12, forming a sliding crosshead structure vertically reciprocable along the guideways with respect to the frame structure 3. As illustrated, the lower ends of the piston rods 9 are secured at 15 within the transverse crosshead frame 14 so that, when hydraulic pressure is supplied to the feed cylinders, the feed pistons are reciprocated therein, moving vertically therewith the sliding crosshead structure. Journaled in ball bearings 16 within the transverse frame 14 is a rotary drive sleeve 17 having a central opening 18 through which a drill rod 19 of the drilling apparatus is adapted to extend. Keyed to the drive sleeve 17 and arranged between the ball bearings 16 is a horizontal spur gear 20 meshing with a spur gear 21 journaled within ball bearings 22 supported within the transverse frame 14 and keyed to a vertical drive shaft 23. This drive shaft has a polygonal drive portion 24 telescopically arranged within a tubular drive shaft 25, the latter having a polygonal opening extending centrally therethrough engaging the polygonal portion of the drive shaft, so that, as the drive shaft moves vertically with the sliding crosshead structure, it slides longitudinally with respect to the tubular drive shaft 25 as it is rotated by the latter. The drive shaft 25 is journaled within ball bearings 26 supported within the transverse upper frame 5, and has keyed thereto a bevel gear 27 meshing with and driven by a bevel gear 28 likewise journaled in a ball bearing 29 supported within the transverse frame 5. The bevel gear 28 is keyed to and driven by a horizontal drive shaft 30 journaled within the upper transverse frame 5 and driven by a chain sprocket 31, the latter in turn being driven by an endless drive chain 32 in the manner clearly described in the co-pending application above referred to. It will thus be seen that, as the sliding crosshead structure is moved vertically along its guideways by the hydraulic feeding mechanism, the rotary drive sleeve 17 is driven through the connections above described, irrespective of the position of the sliding crosshead structure in its guideways relative to the frame structure 3.

Now referring to the improved chuck mechanism, generally designated 1, it will be noted that threadedly secured at 35 within the lower portion of the sliding cross-head frame 14 are vertical cylinders 36 arranged in parallel relation with their axes lying in a vertical plane including the axis of rotation of the rotary drive sleeve 17, and these vertical cylinders contain vertically reciprocable pistons 37 secured to piston rods 38 extending upwardly through stuffing boxes 39 carried by the transverse frame 14. The upper ends of the piston rods 38 are secured at 40 to a transverse frame 41 arranged in parallelism above the frame 14 and supporting a ball bearing 42 in which is journaled the cylindrical hub 43 of a rotatable chuck casing 44. The chuck casing is retained in its supported relation on the ball bearing 42 by means of a retaining annulus 45 threaded on the lower portion of the cylindrical hub 43, the casing having a shoulder engaging an upper surface of the inner ball bearing race, and the retaining annulus 45 engaging the lower surface of the inner ball bearing race. Guided within radial guideways 46 formed within a cylindrical enlargement 47 of the rotary drive sleeve 17, are chuck jaws 48 having the inner surfaces thereof serrated at 49 for gripping engagement with the exterior surface of the drill rod 19. Mounted in slots 50 formed in the chuck casing 44 are blocks 51 connected by pivoted links 52 to the chuck jaws 48; and these blocks 51 have integral bolt portions 53 threaded for the reception of securing nuts, these bolt-like portions 53 extending through adjustable bushings 54 threaded within the chuck casing 44 in the manner shown in Fig. 1. The members 54, upon loosening of the nuts on the bolt portions 53, may be adjusted to take up any wear of the chuck jaws. It will be evident that when hydraulic pressure is supplied to the lower ends of the cylinders 36, the pistons 37 are moved upwardly, moving therewith the transverse frame 41, together with the rotatable chuck casing 44; the chuck casing moving bodily vertically with respect to the rotary drive sleeve 17 so that the chuck jaws 48, through the links 52, are moved inwardly toward one another within their guideways into gripping relation with respect to the drill rod 19, thereby connecting the drill rod to the rotary drive bushing for rotation therewith, and also for vertical adjustment with said drive bushing as the latter moves vertically with the sliding crosshead structure. When the hydraulic pressure is supplied to the upper ends of the cylinders 36, the pistons 37 are moved downwardly, moving therewith the transverse frame 41 and the chuck casing 44, thereby, through the links 52, moving the chuck jaws 48 into their released position shown in Fig. 1.

Now referring to the improved means for supplying hydraulic pressure to the cylinders 36, it will be noted that formed at the opposite sides of the frame structure 3, at the lower end thereof, are integral depending brackets 55 underlying the crosshead frame and having secured therein at 56 vertical pipes 57, these pipes extending upwardly through stuffing boxes 58 carried within members 59 which constitute the securing nuts for securing the lower ends of the piston rods 9 to the sliding crosshead frame 14. The pipes 57 extend upwardly within the bores 60 of the piston rods 9, these bores being of substantially larger diameter than the diameter of the pipes so that the liquid flowing through the pipes is discharged through the open upper ends of the pipes into the piston rod bores. The piston rod bores communicate near their lower ends, through ports 61, with annular chambers 62 formed in the sliding crosshead frame 14. As shown most clearly in Fig. 4, the annular chamber 62, at the right hand side of the transverse frame 14, is connected, through a pipe 63 and branched pipes 64, to the upper ends of the bores of the cylinders 36 at the upper sides of the pistons 37, while the annular chamber 62 at the left hand side of the frame 14 is connected through a pipe 65 and branch pipes 66 to the lower ends of the bores of the cylinders 36 at the lower sides of the pistons 37. Arranged at the left hand side of the frame structure 3 is a conventional four-way valve 67 comprising, as shown in Fig. 6, a valve casing 68 having a bore 69 containing a rotary valve member 70. The opposite sides of this valve member are cut away at 71 and 72. Connected at one side of the valve casing is a supply pipe 73 leading to any suitable source of hydraulic pressure, preferably to the same source of hydraulic pressure as that of the hydraulic feeding mechanism, while connected to the opposite side of the valve casing is a return pipe 74 through which the hydraulic pressure is discharged from the cylinders back to its source. Connected to the upper and lower sides of the valve casing are pipes 75 and 76 leading to the bottoms of the brackets 55 and secured therein at 77, and communicating with the lower ends of the supply pipes 57. When the valve member 70 is in the position shown in Fig. 6, hydraulic pressure may flow from the supply pipe 73 through the cutaway portion 71 of the valve member, through the pipe 75, to the right hand supply pipe 57 through which hydraulic pressure is supplied to the right hand annular chamber 62 and thence through the pipes 63 and 64 to the upper ends of the cylinders 36, the pressure acting on the upper surfaces of the pistons 37 to move the latter downwardly into the position shown in Fig. 1, thereby to release the chuck jaws from the drill rod. When the valve is in the position shown in Fig. 6, the lower ends of the cylinders are connected to the discharge pipe 74 through the pipes 66, 65, the left hand supply pipe 57, pipe 76 and the cut-away portion 72 in the valve member communicating with the discharge pipe 74. When the position of the valve member 70 is reversed, the upper ends of the cylinders 36 are connected to the discharge pipe through the pipes 64, 63, the right hand supply pipe 57, pipe 75, and the cut-away portion of the valve member communicating with the pipe 74. In this reversed position of the valve member, hydraulic pressure may flow from the supply pipe 73, through pipe 76, the left hand supply pipe 57, the left hand annular chamber 62 and pipes 65 and 66, to the lower ends of the cylinders 36, the pressure acting on the lower surfaces of the pistons 37 to move the latter upwardly to connect the chuck jaws with the drill rod. It is accordingly evident that irrespective of the adjusted position of the sliding crosshead structure within its vertical guideways relative to the frame structure 3, hydraulic pressure may always be supplied to the chuck operating cylinders through the supply pipes telescopically arranged within the tubular piston rods, it being possible to apply and release the chuck jaws at the will of the operator regardless of the position of the chuck mechanism simply by operating the four-way valve.

In Figs. 8 and 9, a modified form of adjusting means for taking up any wear of the chuck jaws is disclosed. In this construction, the operating links 52 are pivotally connected to blocks 80 mounted in slots 81 formed in an annulus 82. The annulus 82 is secured by bolts 83 between the top flange of the chuck casing 84 and a top plate 85. Surrounding the annulus 82 and arranged between the top flange of the casing and the top plate 85 is a cam ring 86 having cam surfaces 87. Engaging the cam surfaces on the cam ring are surfaces 88 formed on the blocks 80 and held in engagement with the cam surfaces by coil springs 89 seated in recesses formed in the annulus 82 and engaging the blocks. When any wear of the chuck jaws occurs, the bolts 83 may be loosened, releasing the clamping engagement of the cam ring 86 between the top surface of the chuck casing frame and the top plate 85, and a suitable turning instrument may then be inserted in one of the apertures 90 formed in the cam ring, and the latter may be rotated relative to the annulus 82 to cause the cam surfaces thereon to move the blocks 80 inwardly to adjust the blocks, links, and chuck jaws. When the proper adjustment is attained, the bolts 83 may then again be tightened to clamp the cam ring in position between the top of the flange of the chuck casing and the top plate. Otherwise, this form of the invention is the same as that above described.

As a result of this invention, it will be noted that an improved chuck mechanism is provided operated by hydraulic pressure, preferably derived from the same source as that of the hydraulic feeding mechanism, whereby the chuck jaws may be quickly and powerfully moved into gripping relation with respect to the drill rod and may be quickly released at will. It will further be noted that an improved drill rod chuck mechanism is provided, operated by hydraulic pressure, whereby chuck jaws may be opened and closed at will simply by operating a four-way valve conveniently located at the operator's station of the drilling apparatus. It will further be noted that, by the provision of the improved supply connections between the source of hydraulic pressure supply and the chuck operating cylinders, it is possible to open and close the chuck jaws at will irrespective of the position of the sliding crosshead structure by which the chuck mechanism is carried. These and other uses and advantages of the improved chuck mechanism will be clearly apparent to those skilled in the art.

While there are in this application specifically described one form and a modification which the invention may assume in practice, it will be understood that these are shown for purposes of illustration and that the invention may be further modified and embodied in various other forms without departing from its spirit or the scope of the appended claims.

What I claim as new and desire to secure by Letters Patent is:

1. In a drill rod chuck mechanism, a support guided for bodily movement, a drive sleeve journaled on said support, a drill rod extending centrally through said drive sleeve, a casing coaxial with and surrounding said drive sleeve, a frame on which said casing is journaled, chuck jaws guided on said drive sleeve for connecting said drill rod thereto, connections between said drive sleeve and said chuck jaws, and power-operated means mounted on said support and connected to said frame and operative irrespective of the position of said support for moving said frame and said casing bodily relative to said drive sleeve to actuate said chuck jaws through said connections, said power-operated means comprising parallel cylinders mounted on said support, pistons reciprocable within said cylinders, and means for supplying pressure fluid to said cylinders irrespective of the position of said support.

2. In a drill rod chuck mechanism, a frame having vertical guideways, a crosshead slidable vertically along said guideways, a chuck mounted on said crosshead, a drill rod extending centrally through said chuck and connectible by said chuck to said crosshead for vertical sliding movement therewith, means for rotating said chuck to effect drill rod rotation, hydraulically operated means on said crosshead for operating said chuck, and means for supplying hydraulic pressure to said hydraulically operated chuck-operating means irrespective of the position of said crosshead in its guideways relative to said frame.

3. In a chuck mechanism, a frame having vertical guideways, a crosshead slidable vertically along said guideways, a chuck mounted on said crosshead, hydraulically operated means on said crosshead for operating said chuck, and means for supplying hydraulic pressure to said hydraulically operated chuck-operating means irrespective of the position of said crosshead in its guideways relative to said frame, said hydraulic pressure supply means comprising cooperating telescopically arranged conduits connected to said frame and crosshead respectively.

4. In a drill rod chuck mechanism, a frame having vertical guideways, a crosshead slidable vertically along said guideways, a drive sleeve journaled in said crosshead, a drill rod extending centrally through said drive sleeve, means for rotating said drive sleeve, a casing coaxial with and surrounding said drive sleeve, a transverse frame on which said casing is journaled, chuck jaws guided on said drive sleeve for connecting said drill rod to said drive sleeve, operating connections between said casing and said chuck jaws, and means on said crosshead and connected to said transverse frame and operative irrespective of the position of said crosshead along said guideways for moving the transverse frame and said casing bodily relative to said drive sleeve to actuate said jaws through said operating connections.

5. In a drill rod chuck mechanism, a frame having vertical guideways, a crosshead slidable vertically along said guidways, a drive sleeve journaled in said crosshead, a drill rod extending centrally through said drive sleeve, means for rotating said drive sleeve, a casing coaxial with and surrounding said drive sleeve, a transverse frame on which said casing is journaled, chuck jaws guided on said drive sleeve for connecting said drill rod to said drive sleeve, operating connections between said casing and said chuck jaws, and means on said crosshead and connected to said transverse frame for moving the latter and said casing bodily relative to said drive sleeve to actuate said jaws through said operating connections, said means for bodily moving said transverse frame and casing relative to said drive sleeve comprising cylinders mounted on said crosshead, pistons reciprocable in said cylinders and connected to said transverse frame, and means for supplying hydraulic pressure to said cylinders irrespective of the position of said crosshead along said guideways.

6. In a chuck mechanism, a frame having vertical guideways, a crosshead slidable vertically along said guideways, a drive sleeve journaled in said crosshead, a casing coaxial with and surrounding said drive sleeve, a transverse frame on which said casing is journaled, chuck jaws guided on said drive sleeve, operating connections between said casing and said chuck jaws, and means on said crosshead and connected to said transverse frame for moving the latter and said casing bodily relative to said drive sleeve to actuate said jaws through said operating connections, said means for bodily moving said transverse frame and casing relative to said drive sleeve comprising cylinders mounted on said crosshead, pistons reciprocable in said cylinders and connected to said transverse frame, and means for supplying hydraulic pressure to said cylinders, said hydraulic pressure supply means including cooperating telescopically arranged conduits, one connected to said first-mentioned frame and the other connected to said crosshead.

7. In an apparatus of the character described, a frame providing a guideway, a crosshead movable along said guideway, means on said frame for moving said crosshead, a rotating member journaled on said crosshead, means on said crosshead for rotating said member, a chuck mounted on said crosshead and rotatable with said rotatable member, power means on said crosshead for operating said chuck, and means operable at will and mounted on said frame independently of said crosshead and operatively connected to said power means for controlling the latter irrespective of the position of said crosshead along said guideway.

8. In an apparatus of the character described, a frame providing a guideway, a crosshead movable along said guideway, means on said frame for moving said crosshead, a rotating member journaled on said crosshead, means on said crosshead for rotating said member, a chuck mounted on said crosshead and rotatable with said rotatable member, and power means on said crosshead for operating said chuck comprising a power cylinder carried by said crosshead and relative to which said chuck is rotatable and a reciprocable piston contained in said cylinder and operatively connected to said chuck.

9. In an apparatus of the character described, a frame providing a guideway, a crosshead movable along said guideway, means on said frame for moving said crosshead, a rotating member journaled on said crosshead, means on said crosshead for rotating said member, a chuck mounted on said crosshead and rotatable with said rotatable member, and power means on said crosshead for operating said chuck comprising a power cylinder carried by said crosshead and relative to which said chuck is rotatable and a reciprocable piston contained in said cylinder and operatively connected to said chuck, said operative connection between said piston and said chuck including relatively rotatable operating parts, one non-rotatable and connected to said piston and the other rotatable with said chuck.

10. In a drill rod chuck mechanism, a frame having a vertical guideway, a crosshead slidable along said guideway, a chuck mounted on said crosshead, fluid operated means on said crosshead for operating said chuck, and means for supplying pressure fluid to said operating means irrespective of the position of said crosshead in its guideway relative to said frame including a supply connection on said frame and a supply connection between said connection and said fluid operated means and effective in all relative positions thereof.

11. In a drill rod chuck mechanism, a frame having a vertical guideway, a crosshead slidable along said guideway, a chuck mounted on said crosshead, fluid operated means on said crosshead for operating said chuck, and means for supplying pressure fluid to said operating means irrespective of the position of said crosshead in its guideway relative to said frame including a supply connection on said frame, a supply connection between said connection and said fluid operated means and effective in all relative positions thereof, and a valve associated with said connection on said frame and relative to which said crosshead is movable, for controlling the fluid supply.

12. A drill rod chuck mechanism comprising a frame, a support adapted to be guided for bodily movement relative to said frame, actuating means mounted on said frame for moving said support, a rotatably driven drive member journaled on said support, a chuck associated with said drive member and adapted to engage a drill rod and to transmit drive thereto from said drive member, chuck operating means carried by said support, power transmitting means adapted to transmit power to said chuck operating means irrespective of the position of said support on said frame, and a controlling device mounted on said frame and relative to which said support is movable, for controlling the transmission of power by said power transmitting means to said chuck operating means.

13. A drill rod chuck mechanism comprising a frame including vertically extending guideways, a support comprising a crosshead slidable vertically along said vertically extending guideways, actuating means mounted on said frame for moving said crosshead, a rotatably driven drive member journaled on said crosshead, a chuck associated with said drive member and adapted to engage a drill rod and to transmit drive thereto from said drive member, chuck operating means carried by said crosshead, power transmitting means adapted to transmit power to said chuck operating means irrespective of the position of said crosshead on said frame guideways, and a controlling device mounted on said frame and relative to which said crosshead is movable, for controlling the transmission of power by said power transmitting means to said chuck operating means.

14. A drill rod chuck mechanism comprising a frame, a support adapted to be guided for bodily movement relative to said frame, actuating means mounted on said frame for moving said support, a rotatably driven drive member journaled on said support, a chuck associated with said drive member and adapted to engage a drill rod and to transmit drive thereto from said drive member, chuck operating means carried by said support including power operated mechanism mounted on said support, said power operated mechanism including pressure fluid operated members, power transmitting means adapted to transmit power to said chuck operating means irrespective of the position of said support on said frame, and a controlling device mounted on said frame and relative to which said support is movable, for controlling the transmission of power by said power transmitting means to said operating means, said power transmitting means comprising means for transmitting pressure fluid to actuate said pressure fluid operated members.

15. A drill rod chuck mechanism comprising a frame, a support adapted to be guided for bodily movement relative to said frame, actuating means mounted on said frame for moving said support, a rotatably driven drive member journaled on said support, a chuck associated with said drive member and adapted to engage a drill rod and to transmit drive thereto from said drive member, chuck operating means carried by said support including power operated mechanism mounted on said support, said power operated mechanism including pressure fluid operated members, power transmitting means adapted to transmit power to said chuck operating means irrespective of the position of said support on said frame, and a controlling device mounted on said frame and relative to which said support is movable, for controlling the transmission of power by said power transmitting means to said operating means, said power transmitting means comprising means for transmitting pressure fluid to actuate said pressure fluid operated members, said means for transmitting pressure fluid to actuate said pressure fluid operated members including a supply connection supported on said frame and a second supply connection between said first mentioned supply connection and said pressure fluid operated members, and said controlling device being adapted to control the supply of pressure fluid to said first mentioned supply connection.

HARRY C. JOHANSEN.